(12) United States Patent (10) Patent No.: US 8,231,443 B1
Tomcak et al. (45) Date of Patent: Jul. 31, 2012

(54) METHOD AND APPARATUS FOR PROCESSING A NECK BONE

(75) Inventors: Jason W. Tomcak, Jefferson, SD (US); Jerrad L. Tomcak, Sioux City, IA (US); Adam Pfeifer, Dakota Dunes, SD (US)

(73) Assignee: Tyson Foods, Inc., Springdale, AR (US)

( * ) Notice: Subject to any disclaimer, the term of this patent is extended or adjusted under 35 U.S.C. 154(b) by 0 days.

(21) Appl. No.: 13/026,200

(22) Filed: Feb. 11, 2011

(51) Int. Cl.
*A22C 17/00* (2006.01)
(52) U.S. Cl. ...................................................... 452/135
(58) Field of Classification Search .......... 452/149–152, 452/155–158, 160–162, 135
See application file for complete search history.

(56) References Cited

U.S. PATENT DOCUMENTS

| | | | |
|---|---|---|---|
| 3,750,231 A * | 8/1973 | Schreuder | 452/168 |
| 4,424,608 A * | 1/1984 | Martin | 452/169 |
| 5,045,024 A * | 9/1991 | Diesing | 452/185 |
| 5,425,668 A * | 6/1995 | Martin et al. | 452/63 |
| 5,938,517 A * | 8/1999 | Vineyard et al. | 452/63 |
| 6,033,296 A * | 3/2000 | Herman Winkelmolen | 452/63 |
| 6,811,478 B2 * | 11/2004 | van den Nieuwelaar et al. | 452/117 |
| 7,500,910 B2 * | 3/2009 | Sorensen et al. | 452/117 |

* cited by examiner

*Primary Examiner* — Richard Price, Jr.
(74) *Attorney, Agent, or Firm* — Mark E. Stallion, Esq.; Husch Blackwell LLP

(57) ABSTRACT

A system and method that is adapted to remove portions of a neck-bone that are useful for meat recovery systems. These most useful portions of the neck bone structure are the outer edges distal from the core of the bone that have meat attached to them. The useful portions on the outer edges distal from the core can be safely removed and subsequently processed in downstream processes such as mechanical separators (bone cannons) or hand trimmed. The overall system contains series sub systems to process neck-bones. The subsystems includes, a Product Infeed; a Chain Drive System; a Cutting Apparatus; a Cat Chain; a Core Extractor System; and a Conveyor Washing System.

25 Claims, 10 Drawing Sheets

METHOD AND APPARATUS FOR PROCESSING A NECK BONE

BACKGROUND OF INVENTION

1. Field of Invention

This invention relates generally to animal carcass meat recovery processing and removing meat from a bone structure and, more particularly, to recovering meat from a neck bone.

2. Background Art

Effective lean recovery systems are critical to increasing the lean yield from an animal carcass and thereby increasing the overall cost effectiveness of a processing facility. Effective lean recovery can be difficult from certain bone structures of the carcass. Particularly, areas in close proximity to and including the vertebrae and spine structure. For example, the neck bone structure attached to the chuck primal has a quality lean remnant that is difficult to remove without having bone fragments intermingled with the lean or having concerns with neural spinal column material (GFAP). Neck bones have several pounds of lean on them when removed from the chuck primal. Further the lean on the neck bone is of a grade and quality that it would be a waste to process through bulk rendering.

There are two common practices to recover this lean. One method is to use manual labor where an operator trims and recovers usable meat using a knife, however, this results in a high labor cost. Another common method is to use mechanical separation technologies such as bone cannons or belt/drum separators, which yields more and has less operational costs than manually trimming, however, concerns about GFAP makes mechanical separation more risky. An improved technology would greatly reduce the risk of testing positive for GFAP by eliminating the primary source, mainly the spinal canal and any remaining spinal fluid/sheath. Ultimately, the over all process facility will benefit from the lower cost/higher yielding mechanical separation system without the risk of GFAP and without the high labor cost.

If a mechanical separation system can become a viable option to recover lean from neck-bones, then the result will be a lower cost and higher yielding process than the current manual method. Others have tried to manually saw the spinal canal from the bones. However, as indicated above, the labor costs are too high, and there is a greater risk of injury to the operator. Manually trimming the meat from neck-bones is labor intensive, a safety risk, costly and can result in excessive stress to the laborer. Mechanical separation of meat from neck-bones have been utilized but not effectively. The practice has been eliminated for many processing facilities as far back as 2003 due to the GFAP risk.

The present invention will allow processors to once again use mechanical separation technology. Also, this technology could give processors a competitive advantage by making product that has a lower risk of contaminates than others in the industry. Removing the un-useful portions prior to downstream processing also increases the capacity of the downstream process. This would be a competitive advantage due to improved efficiency from the ability to run a higher volume of bones thru a downstream process with a fixed capacity.

BRIEF SUMMARY OF INVENTION

The invention is a system and method that is adapted to remove portions of a neck-bone that are useful for meat recovery systems. The most useful portions of the neck bone structure are the outer edges distal from the core of the bone that have meat attached to them. The useful portions on the outer edges distal from the core can be safely removed and subsequently processed in downstream processes such as mechanical separators (bone cannons) or hand trimmed. The remaining portion of the neck-bone (Core) is not useful for meat recovery and may contain certain properties that are considered undesirable for fresh meat. These properties include neural matter (GFAP) along with excess calcium and iron.

The present invention, can be categorized as a Neck Core Saw system, which contains a series of sub systems to process neck-bones. The subsystems include: (1) Product Infeed—The product in-feed system consists of a powered conveyor, powered wheel, and fixed guides that allow the neck-bones to safely enter the system. The Neck-bones can be placed on the infeed conveyor of the system with the split face down and feather-bones facing away from a drive chain system. The powered conveyor can transport the neck-bones to the powered wheel and situate them into the fixed product guides. The powered wheel operates above the neck-bone to put downward pressure on it and generate necessary friction to facilitate entry into the drive chain system. The sprocketed powered wheel also assists in aligning the product as the sprockets of the wheel grasp, pulls and holds the product in line; (2) Chain Drive System—The chain drive system consists of a drive chain, pressure arms, and a fixed guide, which also can be a guide having an articulating mechanism thereby providing a floating guide. This system's main function is to position the neck-bone and drive it thru a cutting apparatus. Neck-bones entering the chain drive system can be of various shapes and sizes. Typically they have a curved shape that must be straightened for the best cutting performance. Straightening is achieved by pressing the bone horizontally into a fixed guide, which again also can be a guide having an articulating mechanism thereby providing a floating guide, that runs parallel to the cutting apparatus direction of flow. The bone is pressed to the fixed guide and driven thru the cutting apparatus by a driven chain that runs in the same plane and opposite the fixed guide. The driven chain held in place and guided by a series of pressure arms that can adjust for varying widths of neck-bones and exert enough pressure to straighten the neck-bones against the fixed guide. The pressure arms on the apparatus can utilize pneumatic cylinders to exert this force but other spring mechanisms or spring/torque mechanisms can be utilized such as springs or gas shocks could be used. The fixed guide can be adapted to automatically adjusts vertically to process bones of various thicknesses; (3) Cutting Apparatus—The cutting apparatus removes the useful portions from the neck-bone. The NCS Saw uses two types of cutting apparatuses. There are two band-saws and one circular saw. The band-saws remove the useful portions of bone and lean from the neck-bone. The circular saw can remove featherbones or portions of featherbones not having meat thereon, which are not useful for downstream processing; (4) Caterpillar (Cat) Chain—The main function of the cat chain is to transport the neck-bone from one chain drive system to another in a controlled manner. The cat chain consists of a driven chain, pressure arms, and rollers. The cat chain captures the remaining portion of the neck-bone after the first cutting apparatus (band-saw) removes a useable portion of bone and delivers the remaining portion to the next chain drive system and cutting apparatus. The chain has "U" shaped teeth that saddle the bone to eliminate side to side flexing and operates vertically to put downward force on the bone keeping it flat while transporting it between chain drive systems. Downward force and varying heights are controlled by pressure arms and rollers that guide the chain. Pressure is applied to the pressure arms with pneumatic cylinders however other spring mechanisms or spring/torque mechanisms could be used such as springs or gas shocks; (5) Core Extractor System—The main function of the core extractor system is to separate the unusable portion of bone (core) from the remaining useable portion after the final cutting apparatus. The core extractor system consists of two driven chains and a fixed guide shaft. The lower driven chain runs vertically and puts upward force on the core to capture and guide it along the guide shaft to a point where it can be released to a waste conveyor. The upper driven chain runs above the fixed guide shaft and is angled to the guide shafts length in order to catch the useable portion of bone that remains on top of the core, pull it around the guide shaft, and completely separate it from the core; and (6) Wash Conveyor—The main function of the wash conveyor is to transfer useful portions of the neck-bone away from the cutting apparatuses to a downstream process. The wash conveyor also includes a cabinet with sprays above and below the conveyor bed to remove any residual bone-dust from useful portions of bone. Currently water is used to remove bone-dust, however, an antimicrobial solution could be added as an intervention step also. It is not necessary that the wash conveyor be an integral part of the primary system, in that it could be a step that is accomplished further downstream These and other advantageous features of the present invention will be in part apparent and in part pointed out herein below.

BRIEF DESCRIPTION OF THE DRAWINGS

For a better understanding of the present invention, reference may be made to the accompanying drawings in which.

Figure 1:
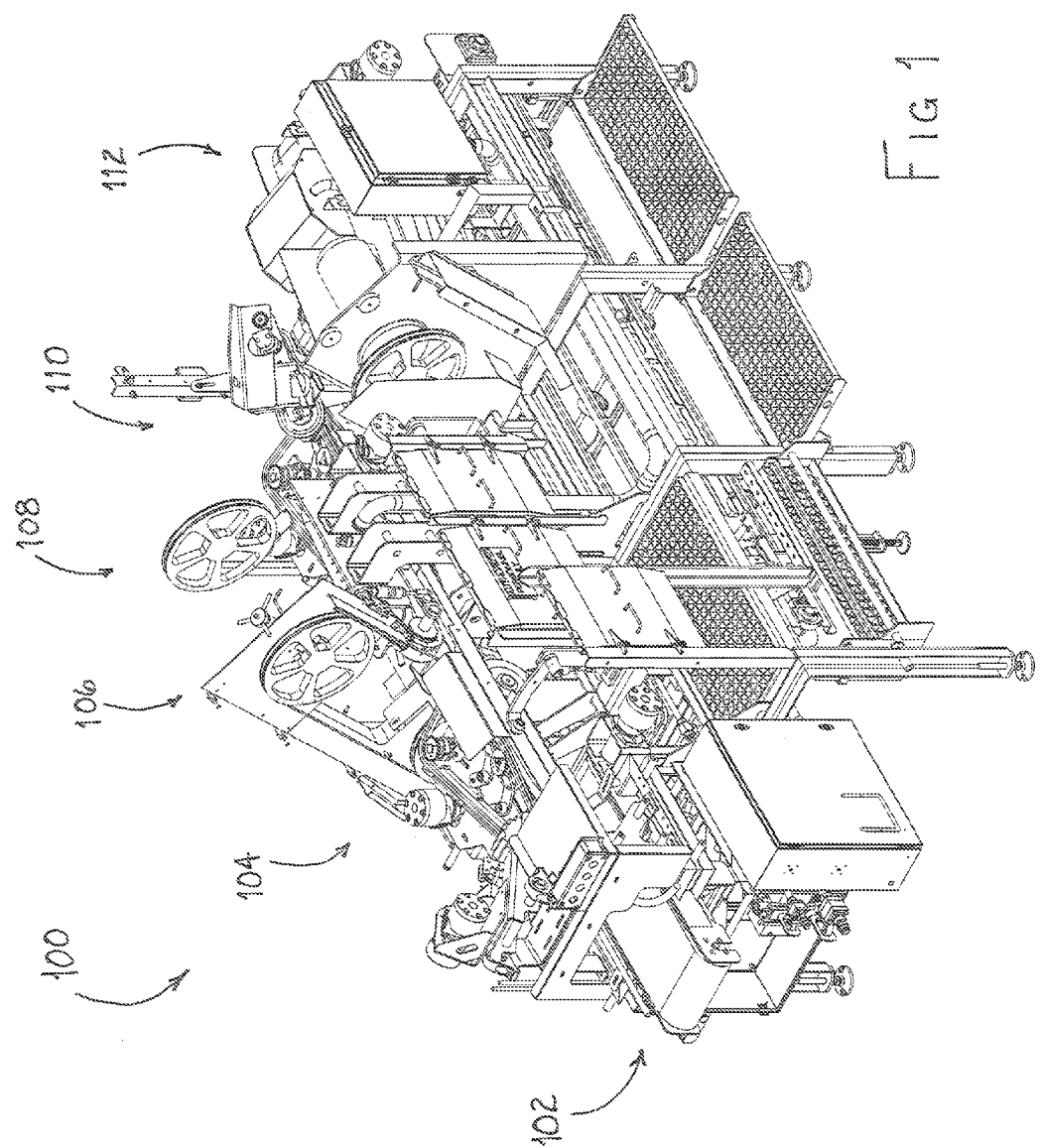
FIG. 1 is a front perspective view of the overall system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIGS. 1-10 and like reference numerals are being used consistently throughout to refer to like and corresponding parts of the invention for all of the various views and figures of the drawing. Also, please note that the first digit(s) of the reference number for a given item or part of the invention should correspond to the FIG. number in which the item or part is first identified.

One embodiment of the present invention comprising a two stage chain drive and cutting station having a transfer cat chain between chain drive and cutting stations teaches a novel system and method for recovering meat from a neck bone. The useful portions on the outer edges distal from the core can be safely removed and subsequently processed in downstream processes such as mechanical separators (bone cannons) or hand trimmed. The overall system contains series sub systems to process neck-bones. The subsystems include, a Product Infeed; a Chain Drive System; a Cutting Apparatus; a Cat Chain; a Core Extractor System; and a Conveyor Washing System.

The details of the invention and various embodiments can be better understood by referring to the figures of the drawing. Referring to FIG. 1, a front perspective view of the overall system is shown. The neck bone meat recovery system 100 comprises various stages each performing a different operation. The Infeed stage 102 includes an Infeed Conveyor and alignment fixtures. A half section of a neck bone structure can be placed on the Infeed Conveyor by an operator, or an automated mechanism can perform the placement, such that the neck bone half is oriented whereby the feather bones extending from the neck bone structure are aligned appropriately with the Infeed alignment mechanisms. Once the neck bone half has been placed on the conveyor with the appropriate orientation, the alignment fixtures will align the neck bone structure for the second stage. The Infeed Conveyor along with an Alignment Wheel will convey the neck bone structure through the alignment fixture and onto the second stage.

The second stage is a Chain Driven Vertical Cutting Stage 104 which includes a horizontally oriented chain drive which can laterally engage a neck bone structure that is being processed and can pull the neck bone structure through the second stage. The horizontally oriented chain drive urges the neck bone structure against a flat guide rail which further aligns the bone structure for the cutting steps. A first cut can be performed at this stage utilizing a circular saw aligned under the flat guiderail such that the circular saw will cut away the featherbone structures. The horizontally oriented chain drive will continue to pull the neck bone structure through a substantially vertically oriented band saw which will cut away and recover a lateral side section of meat from the neck bone structure. The horizontally oriented chain drive will continue to drive the neck bone structure onto the next stage.

The next stage is the Cat Chain Transfer Stage 106 which transfers the neck bone structure from the first cutting stage to a second cutting stage. The Cat Chain Transfer Stage includes a cat chain conveyor which laterally captures the neck bone structure on either side thereby appropriately aligning the structure and transferring it to the next stage. The cat drive continues to drive the neck bone structure to engage the chain drive of the next cutting stage. The Cat chain also facilitates the portion of bone structure with recoverable meat which is cut away and separated to drop away from the core.

The next stage is a Top Cutting Stage 108 which includes approximately horizontal band saw, which is oriented to remove a top portion of meat from the neck bone. The Chain Driven Post Cutting Stage 110 includes multiple chain drives which pulls the recovered meat and the remaining neck bone structure through the cutting stage and onto the Output Stage 112 where the remaining neck bone structure and recovered meat is conveyed appropriately to subsequent processing stages.

Figure 2:
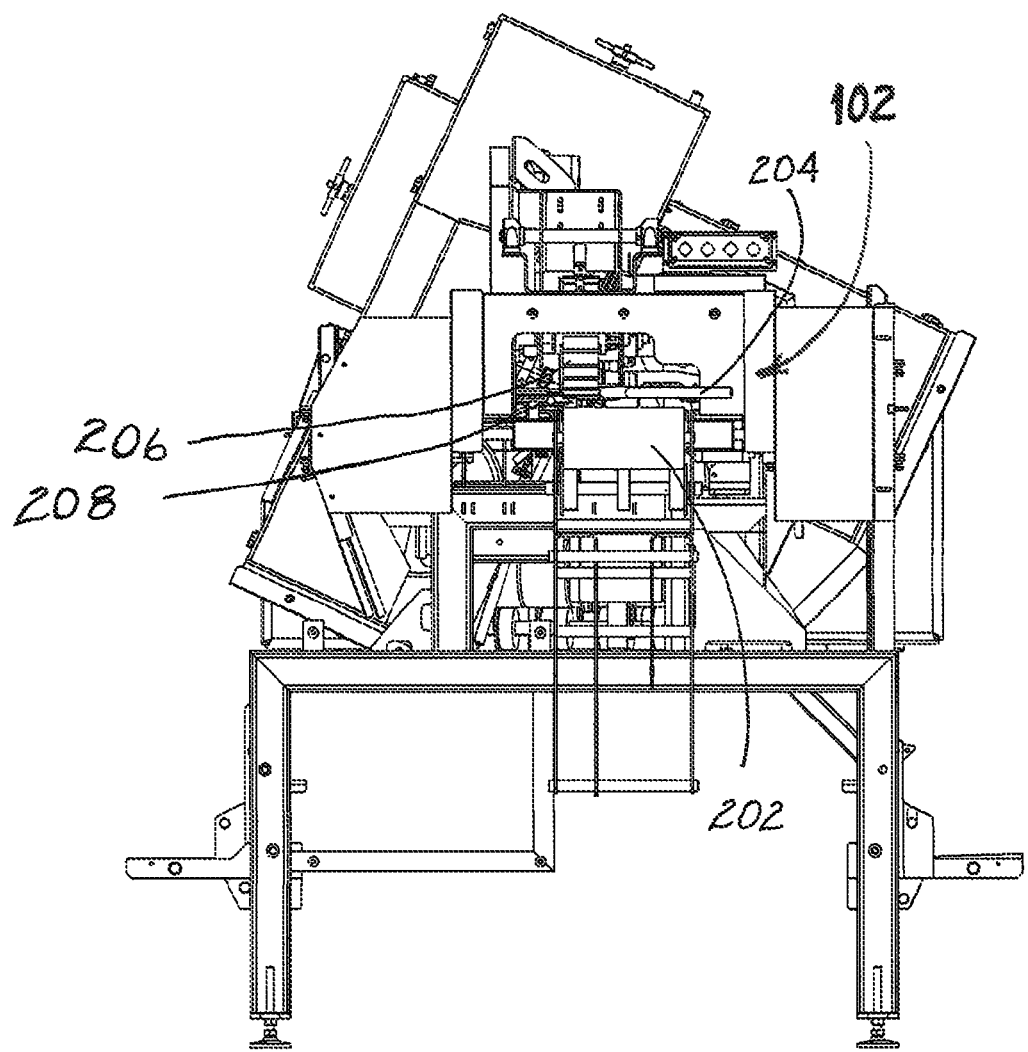
FIG. 2 is a front view of the Infeed End of the system.

Referring to FIG. 2, a front view of the Infeed End of the system is shown. The view reveals the orientation of the alignment fixtures with respect to the Infeed Conveyor. As indicated above, the neck bone structure is placed on the Infeed Conveyor 202 such that the feather bones extending from the neck bone structure extend laterally underneath the Feather Bone Alignment Rod 204. On an opposing side of the neck bone structure as it is being conveyed is a Lateral Alignment Rod 208 which aligns the neck bone structure on the opposing side. The lateral spacing between the two alignment rods can be gradually narrowed as they extend down the path of conveyance. The Alignment Wheel 206 along with the Infeed Conveyor 202 pull the neck bone structure along the alignment fixtures 208 and 204 such that the neck bone structure is appropriately aligned for the initial cut by the circular saw to remove the feather bone structure.

The Feather Bone Alignment Rod 204, the Alignment Wheel 206, and the Infeed Lateral Alignment Rod 208 can be designed with floating articulated mechanisms to adjust to the different sizes of neck bone structures. When the feather bones are being removed the neck bone structure begins to be appropriately engaged by the Lateral Feed Chain Drive 602 and the Flat Guide Rail 610 for further alignment for the featherbone cut and further for the substantially vertical cut to be performed by the substantially vertically oriented band saw. The infeed system facilitates alignment of the neck bone structure for proper positioning and alignment with the Lateral Feed Chain Drive 602 and the Flat Guide Rail 610.

Figure 3:
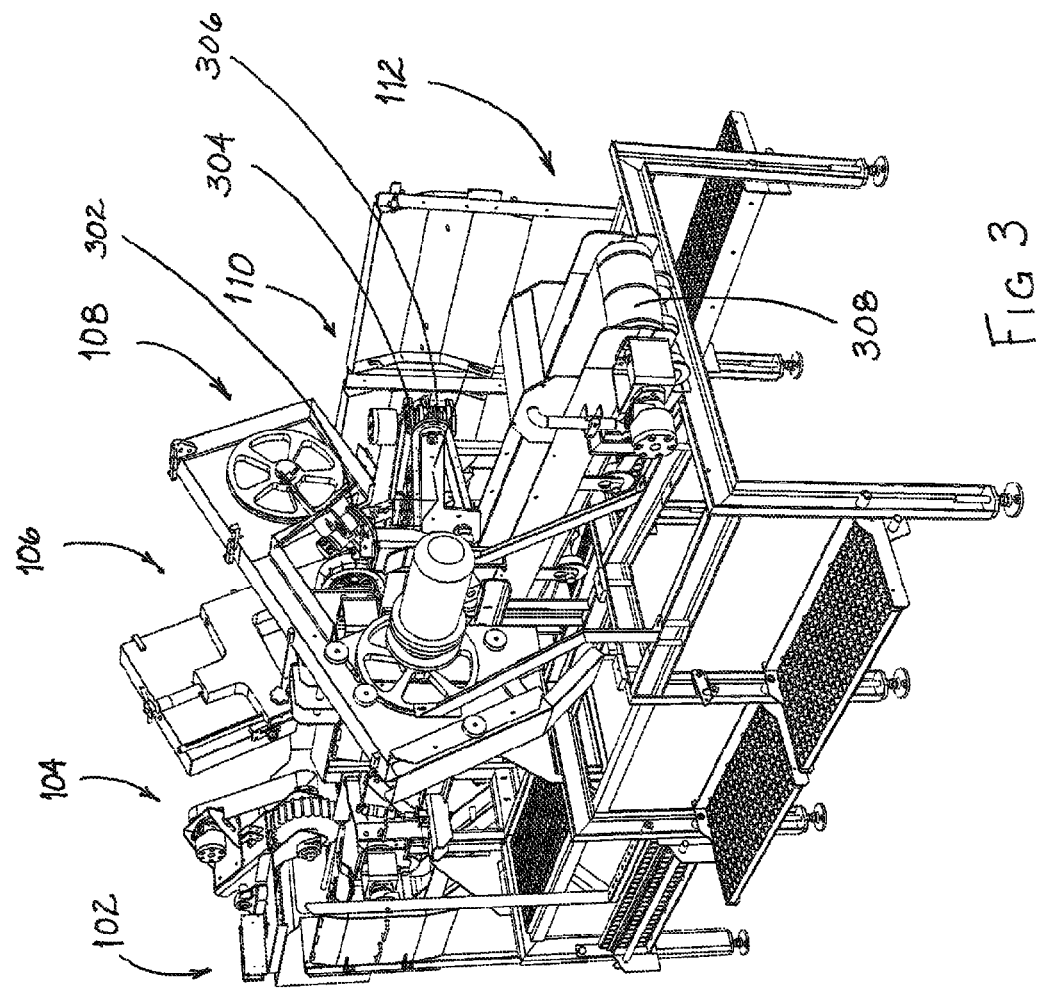
FIG. 3 is a rear perspective view of the overall system.

Referring to FIG. 3, a rear perspective view of the overall system is shown. This view reveals another perspective of the Neck Bone Meat Recovery System 100. Again the system includes various stages including the Infeed Stage 102, the Chain Driven Vertical Cutting Stage 104, the Chain Transfer Stage 106, the Top Cutting Stage 108, the Chain Driven Post Cutting Stage 110 and the Output Stage 112. This view further reveals the Take-Away Conveyor 308 as well as the extraction chain system. The extraction chain system includes a Top oriented Extraction Chain 302 which engages a top portion of the recovered meat and pulls it through the cutting stage. One main purpose of the Extraction Chain 302 is to divert or separate the cut away bone structure from the core. The Lateral Extraction Chain 304 aligns the neck bone structure laterally as well as conveying it through the cutting stage. The In-Line Extraction Chain Drive 306 pulls the remaining neck bone structure through the cutting stage and discharges it to a conveyor.

Each of the chain drives included in the system can also include articulated mechanisms which allow the chain drives to float and adjust to different sizes of neck bone structures while maintaining a firm engagement with the neck bone structure as it is being conveyed. As can be seen from this view the Chain Driven Vertical Cutting Stage 104 includes a band saw fixture. This view reveals that the band saw is not oriented in an absolute vertical fashion. However, the band saw orientation is approximately vertical and can be adjusted for optimal performance. Further, this view reveals that the band saw included in the Top Cutting Stage 108 is not absolutely horizontally oriented. However, the band saw is approximate to a horizontal orientation in order to perform the top cut and removal and recovery of meat from the bone structure. Again, this orientation can be adjusted for optimal performance. It should be further noted that the Top Cut of Stage 108 can be performed before the Vertical Cutting Stage 104. These cutting stages can be alternated as appropriate while including a Cat Chain Transfer Stage 106 there between. However, if the cutting stages are alternated from the configuration shown in the drawing as indicated above, the Cat Chain could potentially be eliminated.

Figure 4:
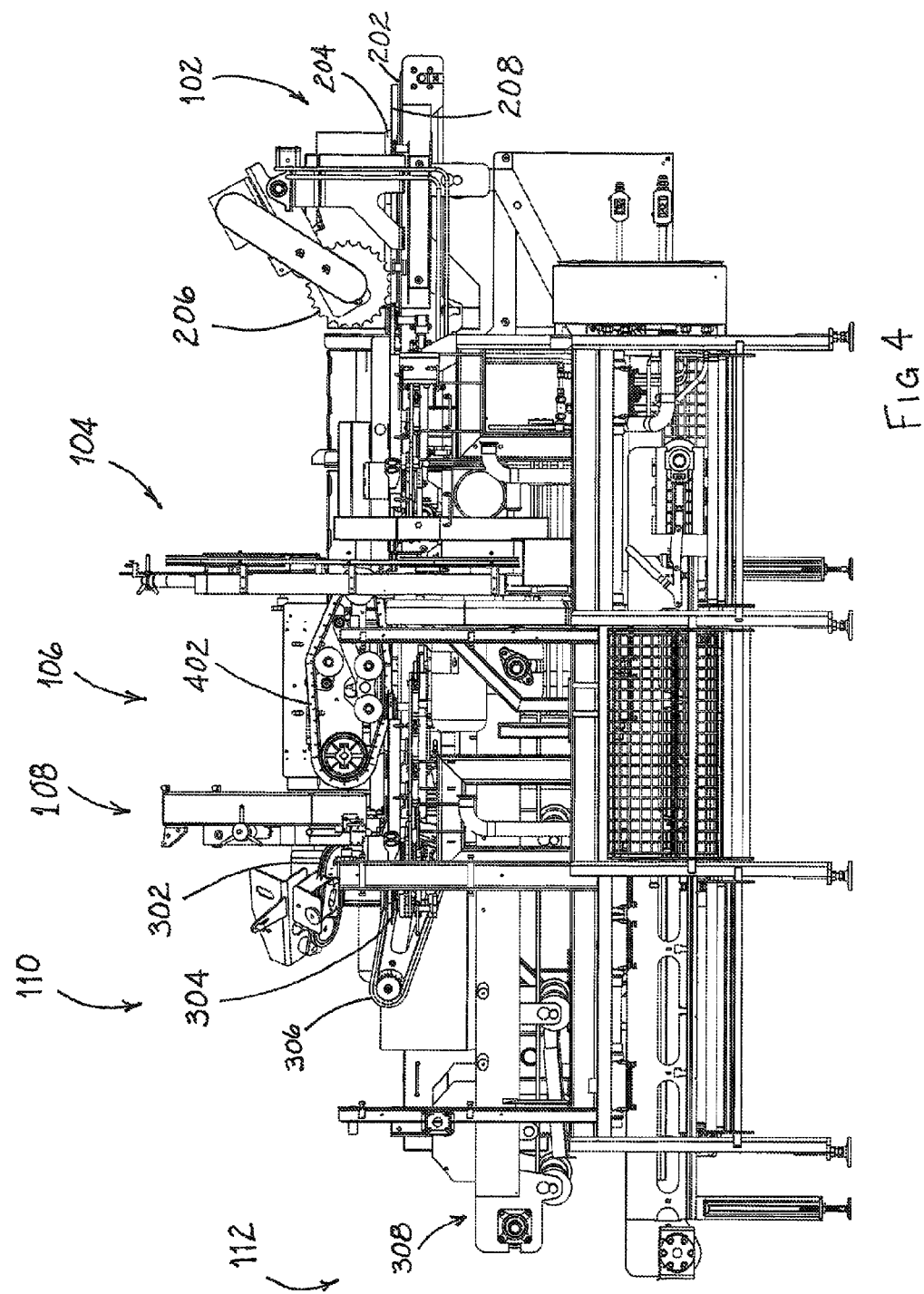
FIG. 4 is a left side view of the overall system.

Referring to FIG. 4, a left side view of the overall system is shown. This side view again reveals another perspective of the various stages 102, 104, 108, 110 and 112. A further perspective of the orientation of the Feather Bone Alignment Rod 204 and the Infeed Lateral Alignment Rod 208 with respect to the Infeed Conveyor 202 is shown. Again the sprocketed Alignment Wheel 206 and the Infeed Conveyor 202 will pull the bone structure through the alignment fixtures and onto the cutting mechanisms. This view also reveals the Transfer Cat Chain 402 which is adapted to laterally align the bone structure on either side while capturing and pulling the bone structure from one stage to the next. Again this Transfer Cat Chain 402 can have articulated mechanisms to adjust to the various sizes of bone structures.

Figure 5:
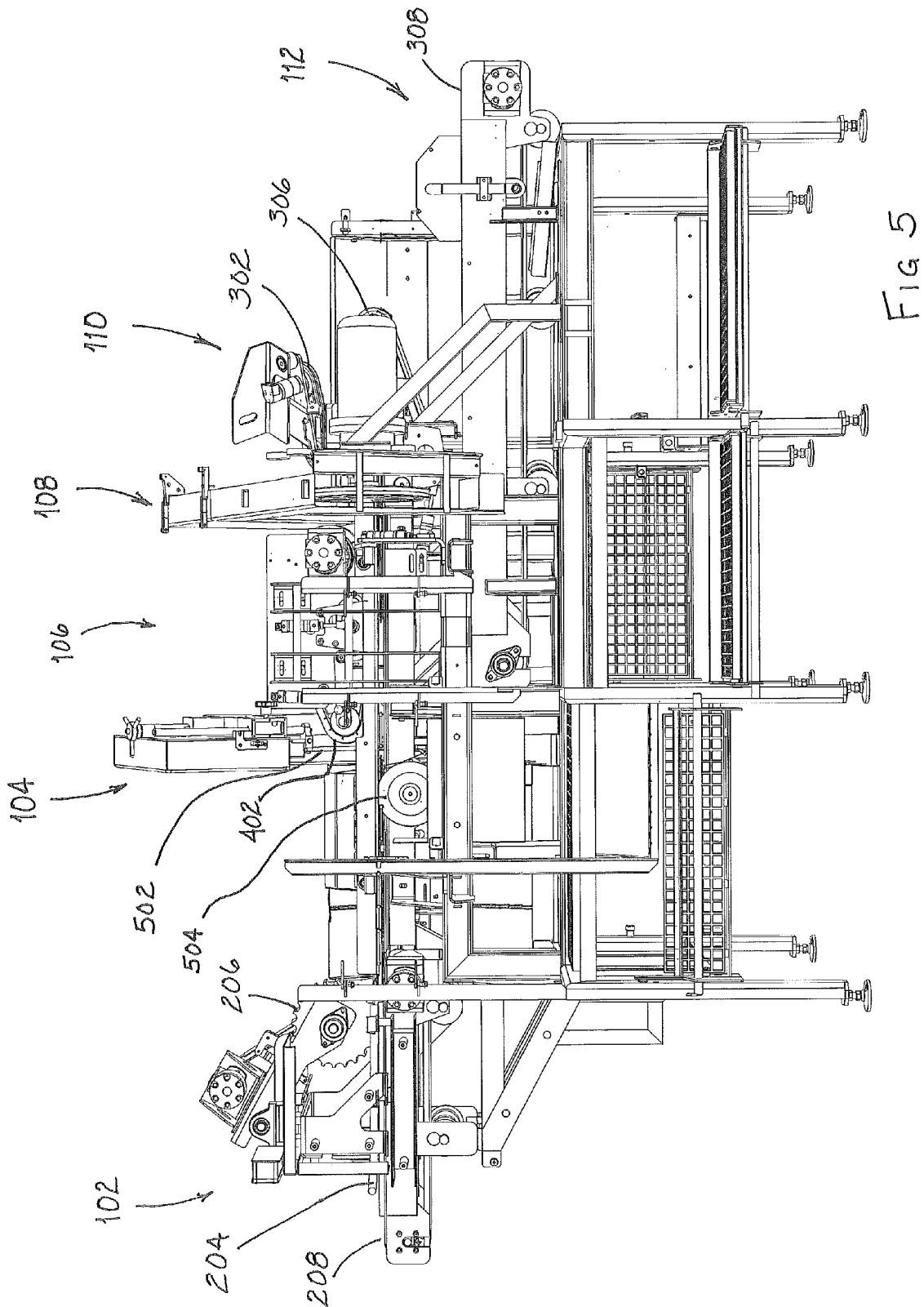
FIG. 5 is a right side view of the overall system.

Referring to FIG. 5, a right side view of the overall system is shown. This opposing side view again reveals the various stages as shown. The orientation of the Circular Saw 504 and the Vertical Side Cut Band Saw Blade 502 is shown. Again the Circular Saw 504 removes the feather bone structures and the Band Saw Blade 502 removes and recovers a lateral portion of meat from the bone structure. As can be seen from this view the Transfer Cat Chain 402 engages the remaining bone structure for aligning and transferring bone structure onto the next cutting stage 108.

Figure 6:
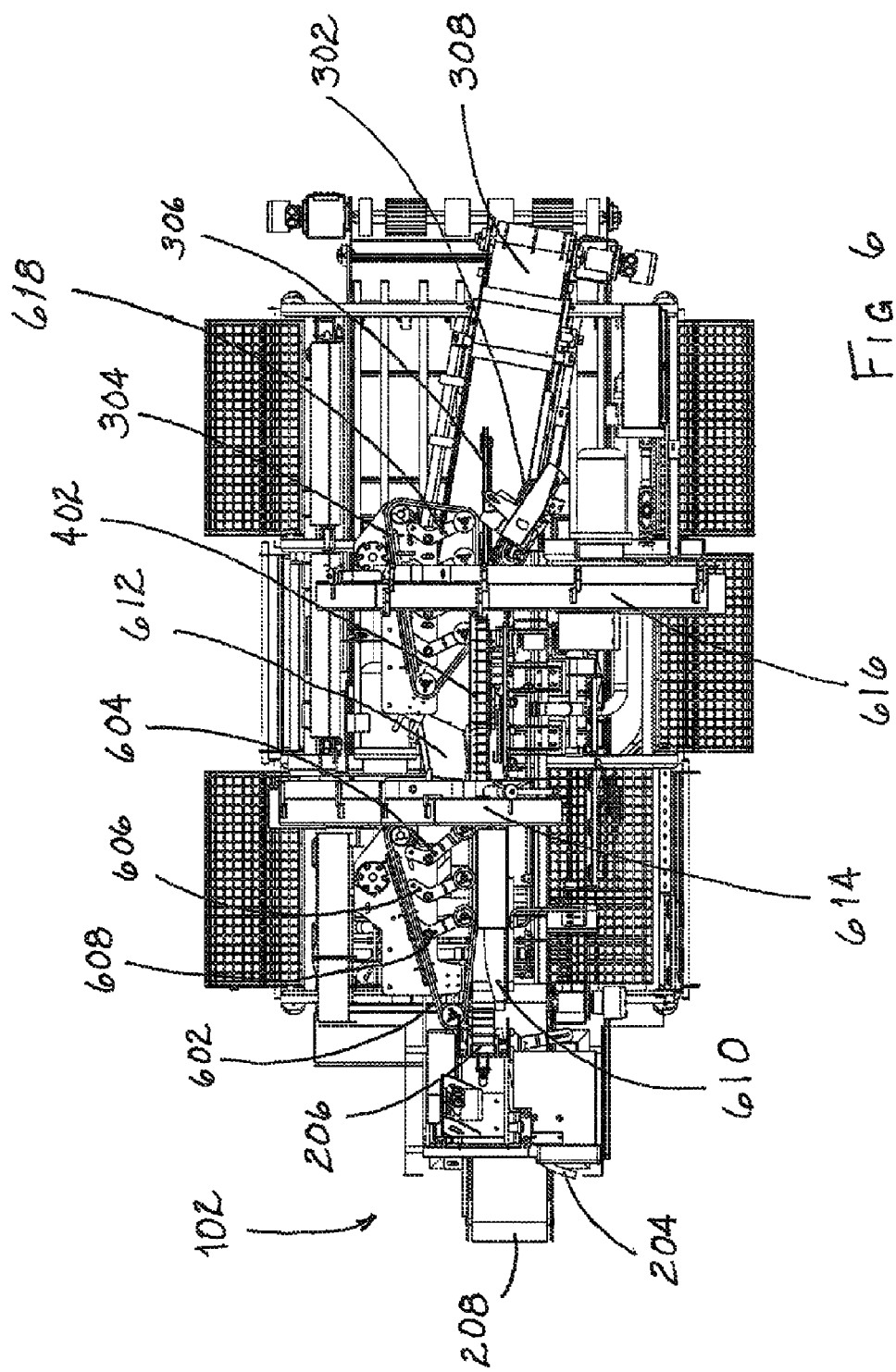
FIG. 6 is a top view of the overall system.

Referring to FIG. 6, a top view of the overall system is shown. This top view reveals another perspective of the Lateral Feed Chain Drive 602 and the Lateral Extraction Chain Drive 304. The Lateral Extraction Chain Drive 304 also provides a feed function as it captures the product prior the cut. Again these chain drives can include articulation mechanisms as shown by items 608, 606 and 604 and 618. These articulated mechanisms as well as other articulated mechanisms described herein can be force loaded to apply a directional force to firmly engage the product and the force loading can be by way of a hydraulic or pneumatic cylinder or otherwise be spring loaded. These articulation mechanisms can apply the appropriate lateral force against the bone structure while adjusting to the different sizes of bone structure. The chain drive as well as other chain drives described herein can also include tensioning mechanisms for adjusting the tension in the chain.

This top view also reveals an Exit Chute 612 through which the initial recovered meat can be channeled to a take away conveyor. This view also reveals a Flat Guide Rail 610 which includes an upper flat rail and a lower flat rail between which the bone structure is conveyed and aligned for the subsequent cuts. The position of the Vertical Side Cut Band Saw 614 and the Horizontal Top Cut Band Saw 616 is also shown. The respective orientations of the Extraction Chain Drives 302, 304 and 306 are also shown. However, what cannot be clearly seen from this view is an Extraction Guide Rod 704 which can be oriented above and in line with the In-Line Extraction Chain Drive 306. This can be utilized for the purpose of urging the bone structure to engage the In-Line Extraction Chain Drive 306.

Again each of the Extraction Chain Drives can have force loaded articulation mechanisms for the purpose of adjusting to the different sizes of bone structures. Further, the Extraction Guide Rod can also have an articulation means again for the purpose of adjusting to the varying size bone structures. This top view also reveals a different perspective of the Transfer Cat Chain 402. From this view it can be seen that the Transfer Cat Chain includes lateral extensions on opposing sides for capturing and aligning the bone structure. The Transfer Cat Chain also includes an internal set of cleats between the lateral extensions for the purpose of grasping and pulling the bone structure to facilitate transfer of the structure from one cutting stage to the next.

Figure 7:
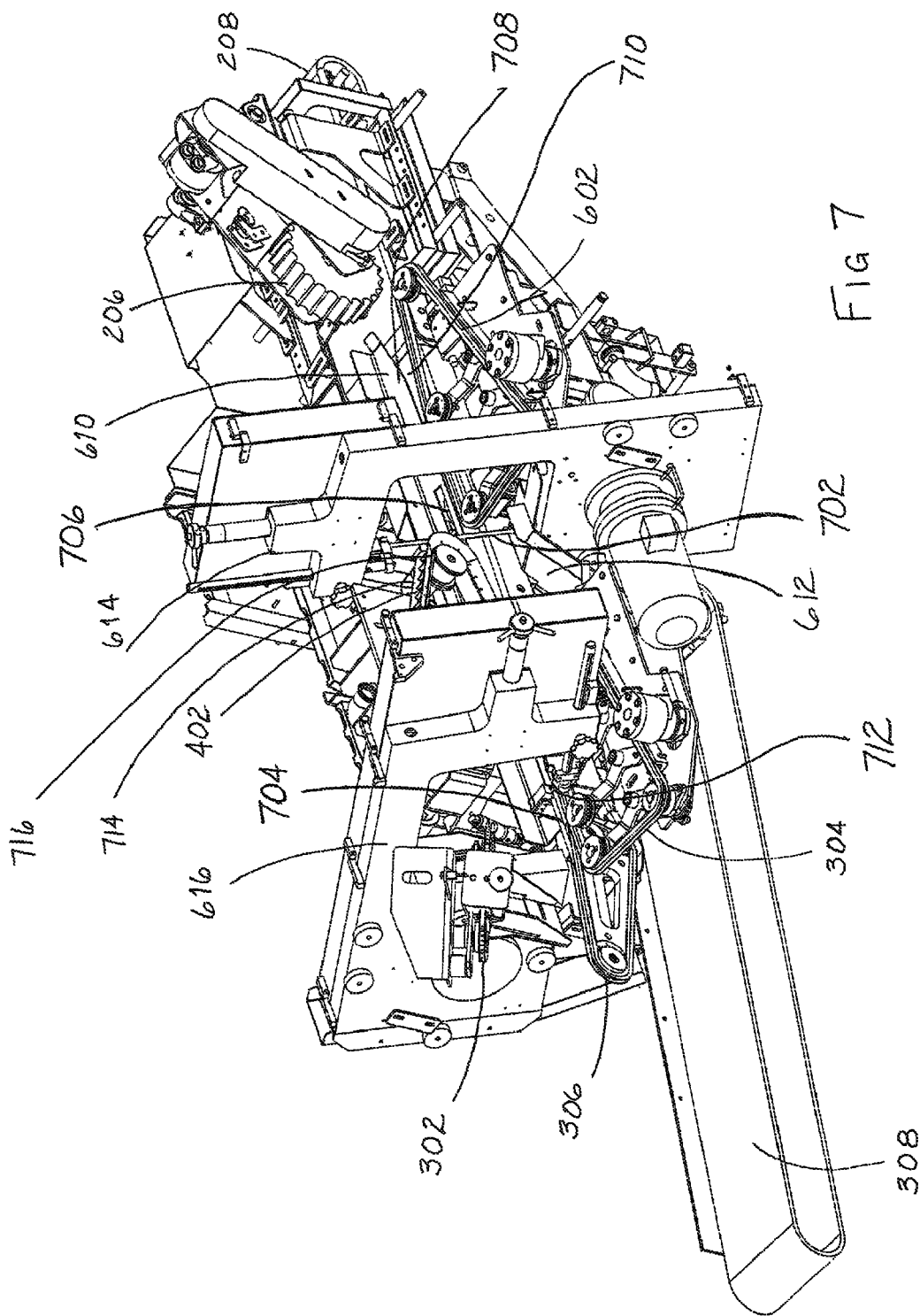
FIG. 7 a perspective view of the Infeed, Cutting, and Transfer Stations.

Referring to FIG. 7, a perspective view of the Infeed, Cutting, and Transfer Stations are shown. This breakout of the cutting stages reveals a more detailed view of various components. As described above, the Alignment Wheel 206 and the Infeed Conveyor 208 will convey the bone structure through the alignment mechanism to properly align and orient the neck bone structure. The neck bone structure is then conveyed into the Flat Guide Rail 610 which includes an Upper Flat Guide Rail Portion 708 and a Lower Guide Rail Portion 710 between which the bone structure is conveyed. The upper and lower portions of the Flat Guide Rail 708 and 710 can each have separate and independent articulation mechanisms to allow for adjustment to the varying sized bone structures.

The Lateral Feed Chain Drive 602 urges the bone structure laterally against the flat guide rail in addition to pulling the bone structure through the flat guide rail to engage the Circular Saw Blade 706 and the Vertical Cut Band Saw Blade 702. The Circular Saw Blade 706 will cut away the feather bone structures attached to the neck bone structure. The substantially vertically oriented Band Saw Blade 702 will remove a lateral portion of meat from the neck bone structure. This portion that is removed is then allowed to drop down through the chute 612 and onto a take away conveyor.

The remaining bone structure is then engaged by the Transfer Cat Chain 402 which includes Lateral Extensions 714 and 716 which are situated on opposing sides of the chain drive and extends substantially in a vertical orientation with respect to the path of conveyance such that the bone structure is contained laterally on either side by the extension 714 and 716. The chain drive can include between the extensions 714 and 716, and cleat like members which can engage the bone structure and pull it and transfer it from one cutting stage to the next. The lateral extensions 714 and 716 need not be continuous but can be intermittent sections while maintaining the effectiveness of the lateral alignment.

The Transfer Cat Chain 402 transfers the bone structure to engage the extraction chain drive system which includes the Top Extraction Chain Drive 302, the Lateral Extraction Chain Drive 304 and the In-Line Extraction Chain Drive 306. The Extraction Chain Drive system can pull the bone structure through the substantially horizontally oriented Band Saw Blade 712 which will remove a top portion of meat from the bone structure. An Extraction Guide Rod 704 can be utilized to assist in engagement of the bone structure and the Extraction Chain Drive.

Figure 8:
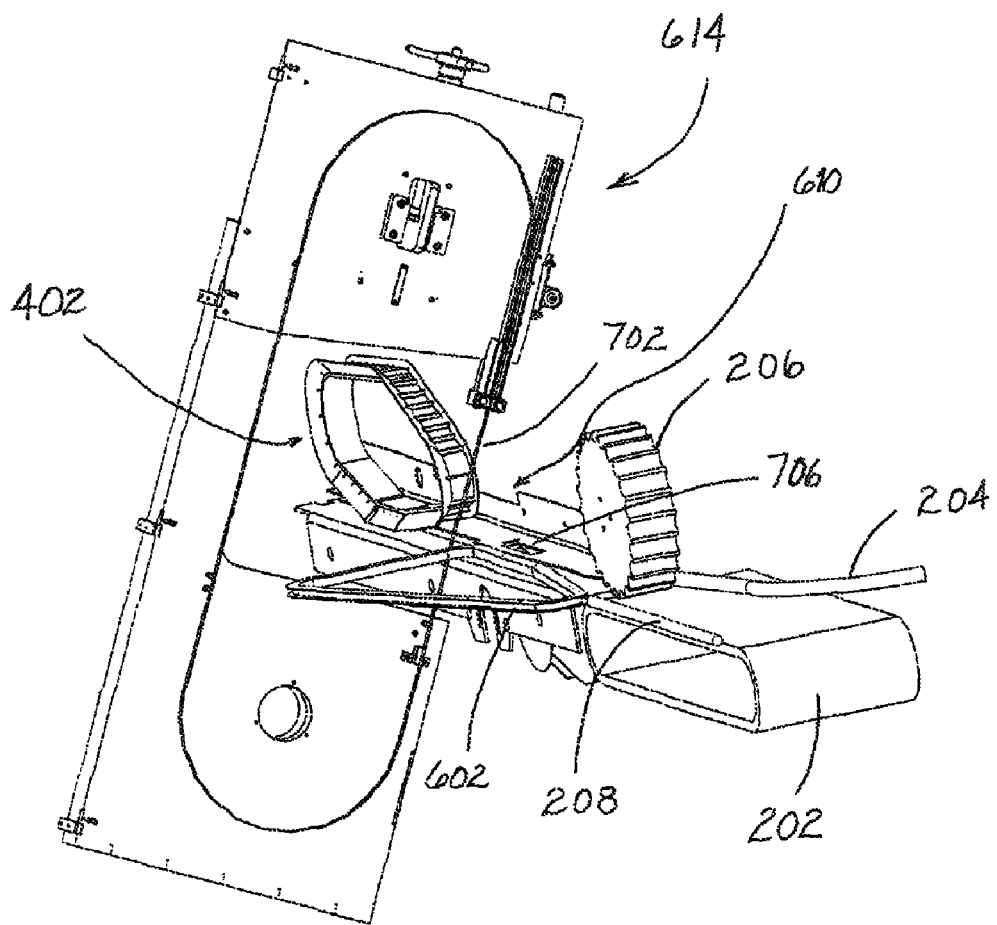
FIG. 8 is a perspective view of selected infeed stage components.

Referring to FIG. 8, a perspective view of selected infeed stage components is shown. An elongated feather bone guide rod 204 is shown, which can be articulatedly mounted proximately above a conveyor belt 202 defining a direction of conveyance and said feather bone guide rod 204, can extend lengthwise in the direction of conveyance and an elongated lateral guide rod 208 can be articulatedly mounted proximately above the conveyor belt extending lengthwise in the direction of conveyance as shown. The lateral guide rod 208 can be laterally spaced apart from said feather bone guide rod, where the feather bone guide rod is adapted to capture feather bones attached to a neck bone structure underneath between the feather bone guide rod and the conveyor belt while laterally aligning the feather bone side of the neck bone structure and where the lateral guide rod is adapted to laterally align a side of a neck bone structure opposite a feather bone side. A sprocketed alignment wheel 206 can be articulatedly mounted proximately above the conveyor belt laterally positioned between the featherbone guide rod and the lateral guide rod and having a direction of rotation in line with the direction of conveyance.

A neck bone structure can be conveyed from an infeed end of the conveyor belt to a discharge or exit end of the conveyor belt and the discharge end can be vertically and horizontally aligned to now feed a neck bone structure being conveyed and aligned between the upper and lower flat guide rails. A flattened guide rail 610 having proximately vertically spaced apart upper and lower flattened elongated flanges extending substantially parallel one with respect to the other and forming a lengthwise gap there between and extending adjacent to and along the path of conveyance and where said lengthwise gap is positioned to receive product therein from the infeed conveyor. A horizontally oriented lateral infeed chain drive 602 can have a side run of that is vertically aligned and proximately adjacent the lengthwise gap. A circular saw blade of a circular saw extending vertically upward through a cut-out in the upper and lower elongated flanges is also shown. A substantially vertically oriented band saw blade of a substantially vertically oriented band saw can extend proximately adjacent the lengthwise gap for effecting a substantially vertical cut to thereby remove and recover a lateral portion of meat from the neck bone structure.

The upper elongated flattened flange can have a lengthwise elongated side notch as shown and a vertically oriented cat chain of a cat chain drive where the top run and bottom run of the cat chain extend in the direction of the path of conveyance and the bottom run can extend and align proximately above the elongated side notch as shown. The cat chain can have laterally space apart flanges, which extend substantially vertically when traveling along the bottom run thereby forming a capture space there between and having a plurality of cleats vertically extending from the cat chain and in the capture space when traveling along the bottom run.

Figure 9:
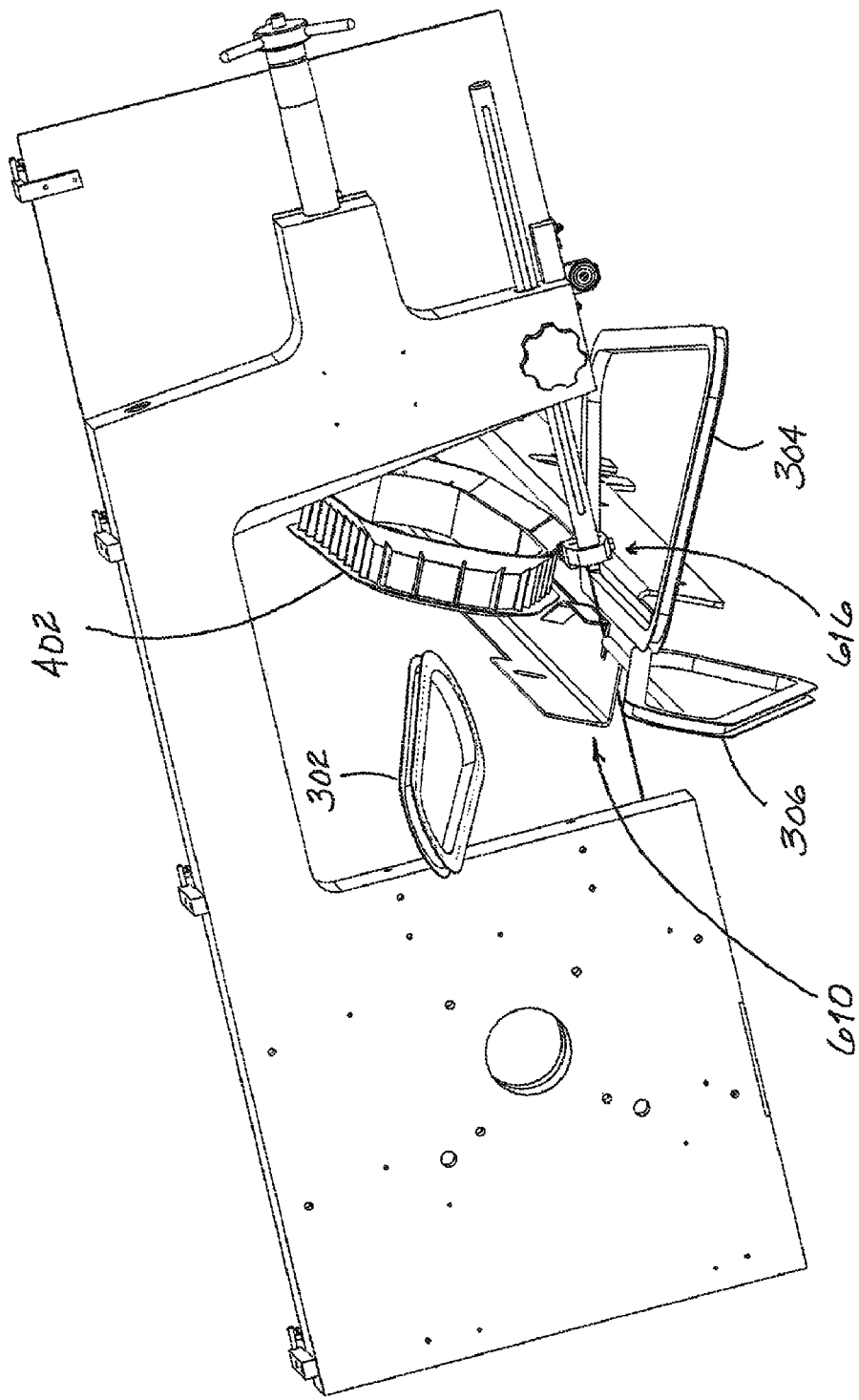
FIG. 9 is a perspective view of selected output stage components.

Referring to FIG. 9, a perspective view of selected output stage components is shown. A vertically oriented cat chain of a cat chain drive where the top run and bottom run of the cat chain extend in the direction of the path of conveyance and the bottom run extending and aligned proximately above the elongated side notch and said cat chain having laterally space apart flanges, which extend substantially vertically when traveling along the bottom run thereby forming a capture space there between and having a plurality of cleats vertically extending from the cat chain and in the capture space when traveling along the bottom run. A horizontally oriented extraction chain drive vertically aligned is also shown and is proximately adjacent the lengthwise gap. A vertically oriented extraction chain drive having a top run laterally aligned under the path of conveyance is shown proximate the exit end of the flat guide rail. A substantially horizontally oriented band saw blade of a substantially horizontally oriented band saw is shown extending through the lengthwise gap and thereby adapted to cut away and recover a top portion of meat from a neck bone structure. The orientation of the top extraction chain drive is also shown.

Figure 10:
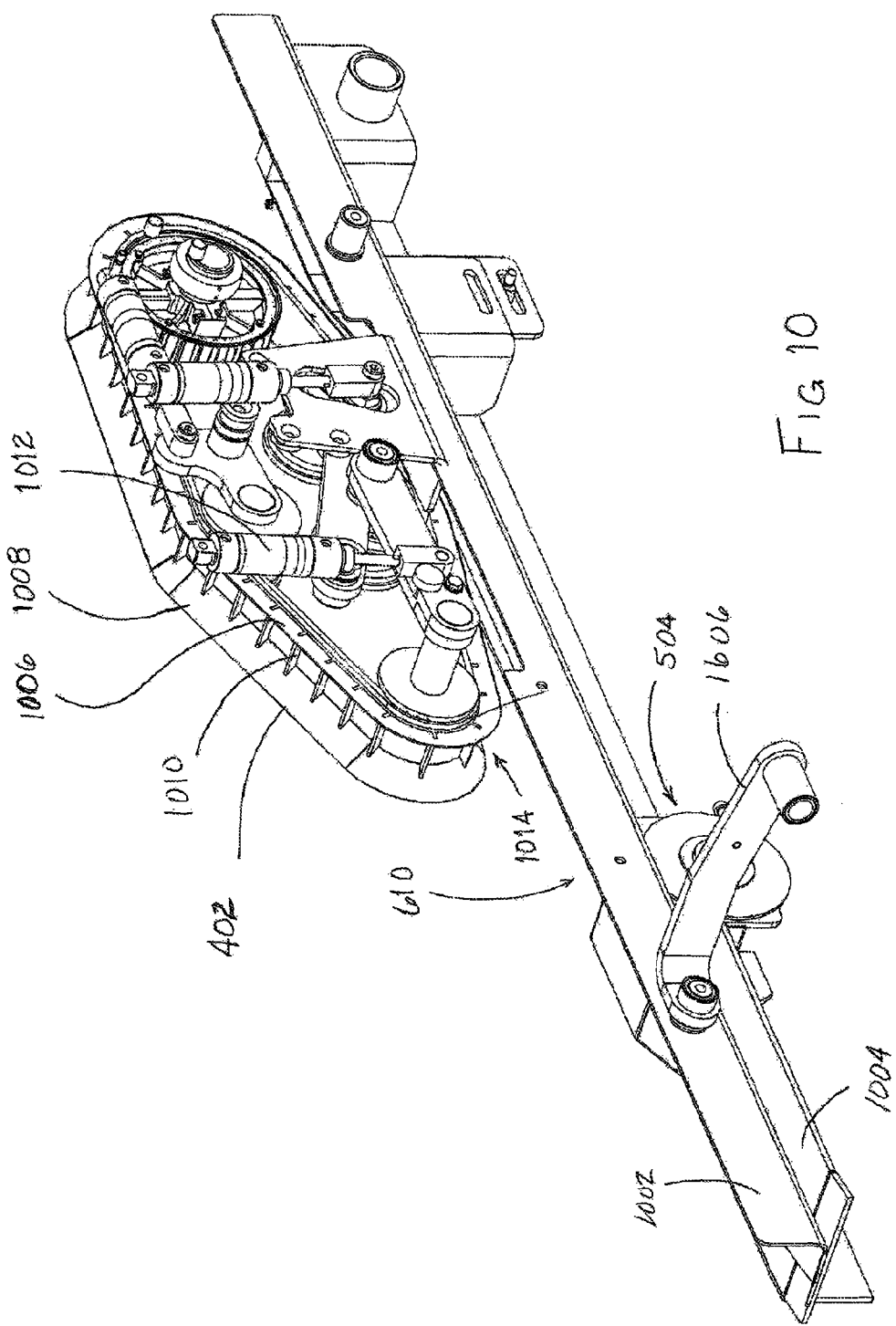
FIG. 10 is a perspective view of selected components from the Cat Chain Transfer stage.

Referring to FIG. 10, a perspective view of selected components from the Cat Chain Transfer stage is shown. A vertically oriented cat chain 402 of a cat chain drive is shown where the top run and bottom run of the cat chain extend in the direction of a path of conveyance and the bottom run extending and aligned proximately above an elongated side notch of the flat guide rail 610 and said cat chain having laterally space apart flanges, 1006 and 1008 which extend substantially vertically when traveling along the bottom run thereby forming a capture space 1014 there between and having a plurality of cleats 1010 vertically extending from the cat chain and in the capture space when traveling along the bottom run. Therefore, a product being conveyed between the upper 1002 and the lower 1004 flat guide rails can be aligned and captured in the capture space between the laterally spaced apart flanges and engaged by the cleats. This alignment and capture achieved by the cat chain can effect transfer of the product from one cutting stage to the next.

The various neck core cutting system examples shown above illustrate a new method that allows for safe and cost effective meat recovery from a neck bone structure. A user of the present invention may choose any of the above neck core processing systems or methods, or an equivalent thereof, depending upon the desired application. In this regard, it is recognized that various forms of the subject neck core meat recovery system could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. An apparatus for processing a neck bone for meat recovery comprising:
    an infeed conveyor having a conveyance surface adapted to support and convey a product along a path of conveyance;
    a feather-bone guide rod extending lengthwise and adjacently along the path of conveyance and disposed proximately above the conveyance surface; and
    a lateral guide rod extending lengthwise and adjacently along the path of conveyance and disposed proximately above the conveyance surface and proximately laterally spaced apart from the feather bone guide rod where the spacing between the lateral guide rod and the feather-bone guide rod is gradually reduced.

2. The apparatus as recited in claim 1 further comprising:
    a sprocketed alignment wheel having a direction of rotation aligned with and above the path of conveyance and disposed proximately above the conveyance surface.

3. The apparatus as recited in claim 2, where the feather-bone guide rod is articulatedly mounted having a vertical range of elevation above the conveyance surface from a lowermost feather-bone guide rod position to a highest most feather-bone guide rod position and where said feather-bone articulated mount is spring loaded to apply a force vertically downward force toward the conveyance surface for capturing various sized feather bones there under.

4. The apparatus as recited in claim 2, where the lateral guide rod is articulatedly mounted having a lateral range of motion from a closest position to the feather-bone guide rod to a furthest position from the feather-bone guide rod and where said lateral guide rod articulated mount is spring loaded to apply a later force toward the featherbone guide rod for laterally aligning the various sized neck bone structures.

5. The apparatus as recited in claim 2, where the sprocketed alignment wheel is articulatedly mounted having a vertical range of elevation above the conveyance surface from a lowermost position to a highest most position and where said sprockets of the alignment wheel have optimal spacing to engage, capture and align various sized neck bone structures.

6. The apparatus as recited in claim 2 further comprising:
    a flattened guide rail having proximately vertically spaced apart upper and lower flattened elongated flanges extending substantially parallel one with respect to the other and one dispose vertically above the other and forming a lengthwise gap there between and extending adjacent to and along the path of conveyance and where said lengthwise gap is positioned to receive various sized neck bone structures there between from the infeed conveyor.

7. The apparatus as recited in claim 6, where the upper flattened elongated flange is articulatedly mounted having a vertical range of elevation above the lower flattened elongated flanges from a lowermost flattened elongated flange position to a highest most flattened elongated flange position and where said feather-bone articulated mount is spring loaded to apply a force vertically downward force toward the conveyance surface for capturing various sized neck bone structures there under.

8. The apparatus as recited in claim 6 further comprising:
    a horizontally oriented infeed chain drive where a chain side run of the infeed chain drive is vertically aligned and proximately adjacent the lengthwise gap;
    a circular saw blade of a circular saw extending vertically upward through a cut-out in the upper and lower elongated flanges; and
    a substantially vertically oriented band saw blade of a substantially vertically oriented band saw extending proximately adjacent the lengthwise gap for effecting a substantially vertical cut.

9. The apparatus as recited in claim 8, where the upper elongated flattened flange has a lengthwise elongated side notch and further comprising:
    a vertically oriented cat chain of a cat chain drive where the top run and bottom run of the cat chain extend in the direction of the path of conveyance and the bottom run extending and aligned proximately above the elongated side notch and said cat chain having laterally space apart flanges, which extend substantially vertically downward when traveling along the bottom run thereby forming a capture space there between and having a plurality of cleats vertically extending from the cat chain and in the capture space when traveling along the bottom run.

10. The apparatus as recited in claim 9, further comprising:
    a horizontally oriented extraction chain drive vertically aligned and proximately adjacent the lengthwise gap;
    a vertically oriented extraction chain drive having a top run laterally aligned under the path of conveyance; and
    a substantially horizontally oriented band saw blade of a substantially horizontally oriented band saw extending through the lengthwise gap.

11. An apparatus for processing a neck bone for meat recovery comprising:
    a flattened guide rail having proximately vertically spaced apart upper and lower flattened elongated flanges extending substantially parallel one with respect to the other and forming a lengthwise gap there between and extending adjacent to and along a path of conveyance and where said lengthwise gap is adapted to receive product therein and where the upper elongated flattened flange has a lengthwise elongated side notch; and
    a vertically oriented cat chain of a cat chain drive where the top run and bottom run of the cat chain extend in the direction of the path of conveyance and the bottom run extending and aligned proximately above the elongated side notch and said cat chain having laterally space apart flanges, which extend substantially vertically when traveling along a bottom run thereby forming a capture space there between and having a plurality of cleats vertically extending from the cat chain and in the capture space when traveling along the bottom run.

12. The apparatus as recited in claim 11 further comprising:
- a horizontally oriented infeed chain drive where a side run is vertically aligned and proximately adjacent the lengthwise gap; and
- a horizontally oriented extraction chain drive vertically aligned and proximately adjacent the lengthwise gap.

13. The apparatus as recited in claim 12 further comprising:
- a flattened guide rail having proximately vertically spaced apart upper and lower flattened elongated flanges extending substantially parallel one with respect to the other and forming a lengthwise gap there between and extending adjacent to and along the path of conveyance and where said lengthwise gap is positioned to receive product therein from the infeed conveyor.

14. The apparatus as recited in claim 13, where the upper flattened elongated flange is articulatedly mounted having a vertical range of elevation above the lower flattened elongated flanges from a lowermost flattened elongated flange position to a highest most flattened elongated flange position and where said feather-bone articulated mount is spring loaded to apply a force vertically downward force toward the conveyance surface for capturing various sized neck bone structures there under.

15. The apparatus as recited in claim 13 further comprising:
- a horizontally oriented infeed chain drive where a chain side run of the infeed chain drive is vertically aligned and proximately adjacent the lengthwise gap;
- a circular saw blade of a circular saw extending vertically upward through a cut-out in the upper and lower elongated flanges; and
- a substantially vertically oriented band saw blade of a substantially vertically oriented band saw extending proximately adjacent the lengthwise gap for effecting a substantially vertical cut.

16. An apparatus for processing a neck bone for meat recovery comprising:
- a flattened guide rail having proximately vertically spaced apart upper and lower flattened elongated flanges extending substantially parallel one with respect to the other and forming a lengthwise gap there between and extending adjacent to and along the path of conveyance and where said lengthwise gap is positioned to receive product therein from the infeed conveyor;
- a horizontally oriented infeed chain drive where a side run is vertically aligned and proximately adjacent the lengthwise gap;
- a circular saw blade of a circular saw extending vertically upward through a cut-out in the upper and lower elongated flanges;
- a substantially vertically oriented band saw blade of a substantially vertically oriented band saw extending proximately adjacent the lengthwise gap for effecting a substantially vertical cut;
- a vertically oriented cat chain of a cat chain drive where the top run and bottom run of the cat chain extend in the direction of the path of conveyance and the bottom run extending and aligned proximately above the elongated side notch and said cat chain having laterally space apart flanges, which extend substantially vertically when traveling along a bottom run thereby forming a capture space there between and having a plurality of cleats vertically extending from the cat chain and in the capture space when traveling along the bottom run; and
- a horizontally oriented extraction chain drive vertically aligned and proximately adjacent the lengthwise gap.

17. The apparatus as recited in claim 16 further comprising:
- a sprocketed alignment wheel having a direction of rotation aligned with and above the path of conveyance and disposed proximately above the conveyance surface.

18. The apparatus as recited in claim 17, where the featherbone guide rod is articulatedly mounted having a vertical range of elevation above the conveyance surface from a lowermost feather-bone guide rod position to a highest most feather-bone guide rod position and where said feather-bone articulated mount is spring loaded to apply a force vertically downward force toward the conveyance surface for capturing various sized feather bones there under.

19. The apparatus as recited in claim 18, where the lateral guide rod is articulatedly mounted having a lateral range of motion from a closest position to the feather-bone guide rod to a furthest position from the feather-bone guide rod and where said lateral guide rod articulated mount is spring loaded to apply a later force toward the featherbone guide rod for laterally aligning the various sized neck bone structures.

20. The apparatus as recited in claim 19, where the sprocketed alignment wheel is articulatedly mounted having a vertical range of elevation above the conveyance surface from a lowermost position to a highest most position and where said sprockets of the alignment wheel have optimal spacing to engage, capture and align various sized neck bone structures.

21. The apparatus as recited in claim 19, further comprising:
- an infeed conveyor having a conveyance surface adapted to support and convey a product along a path of conveyance;
- a feather-bone guide rod extending lengthwise and adjacently along the path of conveyance and disposed proximately above the conveyance surface; and
- a lateral guide rod extending lengthwise and adjacently along the path of conveyance and disposed proximately above the conveyance surface and proximately laterally spaced apart from the feather bone guide rod where the spacing between the lateral guide rod and the feather-bone guide rod is gradually reduced.

22. An method for processing a neck bone for meat recovery comprising the steps of:
- advancing a product along a flattened guide rail having proximately vertically spaced apart upper and lower flattened elongated flanges extending substantially parallel one with respect to the other and forming a lengthwise gap there between and where said product advances through the lengthwise gap by conveying along with a horizontally oriented infeed chain drive where a side run of the chain drive is vertically aligned and proximately adjacent the lengthwise gap;
- cutting away a lateral side portion of the product with a circular saw extending vertically upward through a cut-out in the upper and lower elongated flanges;
- cutting away an opposing lateral side portion of the product with a substantially vertically oriented band saw extending proximately adjacent the lengthwise gap for effecting a substantially vertical cut; and
- transitioning the product to a horizontally oriented extraction chain drive vertically aligned and proximately adjacent the lengthwise gap utilizing a vertically oriented cat chain of a cat chain drive where the top run and bottom run of the cat chain extend in the direction of the path of conveyance and the bottom run extending and aligned proximately above the elongated side notch and said cat chain having laterally space apart flanges, which extend substantially vertically when traveling along a bottom run thereby forming a capture space there between and capturing the product therein and advancing with a plurality of cleats vertically extending from the cat chain and in the capture space when traveling along the bottom run.

23. The method as recited in claim 22, further comprising the steps of:
   placing and conveying the product on an infeed conveyor having a conveyance surface adapted to support and convey a product along a path of conveyance;
   capturing and aligning the product with a first guide rod extending lengthwise and adjacently along the path of conveyance and disposed proximately above the conveyance surface; and
   laterally aligning a second guide rod extending lengthwise and adjacently along the path of conveyance and disposed proximately above the conveyance surface and proximately laterally spaced apart from the first guide rod where the spacing between the second guide rod and the first guide rod is gradually reduced.

24. An apparatus for processing a neck bone for meat recovery comprising:
   a vertically oriented cat chain of a cat chain drive where the top run and bottom run of the cat chain extend in the direction of the path of conveyance and the bottom run extending and aligned proximately above the elongated side notch and said cat chain having laterally space apart flanges, which extend substantially vertically when traveling along a bottom run thereby forming a capture space there between and having a plurality of cleats vertically extending from the cat chain and in the capture space when traveling along the bottom run.

25. An apparatus for processing a neck bone for meat recovery comprising:
   an elongated feather bone guide rod articulatedly mounted proximately above a conveyor belt defining a direction of conveyance and said feather bone guide rod extending lengthwise in the direction of conveyance and an elongated lateral guide rod articulatedly mounted proximately above the conveyor belt extending lengthwise in the direction of conveyance and laterally spaced apart from said feather bone guide rod, where the feather bone guide rod is adapted to capture feather bones attached to a neck bone structure underneath while laterally aligning the feather bone side of the neck bone structure and where the lateral guide rode is adapted to laterally align a side of a neck bone structure opposite a feather bone side; and
   a sprocketed alignment wheel articulatedly mounted proximately above the conveyor belt laterally positioned between the featherbone guide rod and the lateral guide rod and having a direction of rotation in line with the direction of conveyance.

* * * * *